Feb. 26, 1935.  B. E. HORNE  1,992,212
STEAM BOILER REGULATOR
Filed Feb. 27, 1933
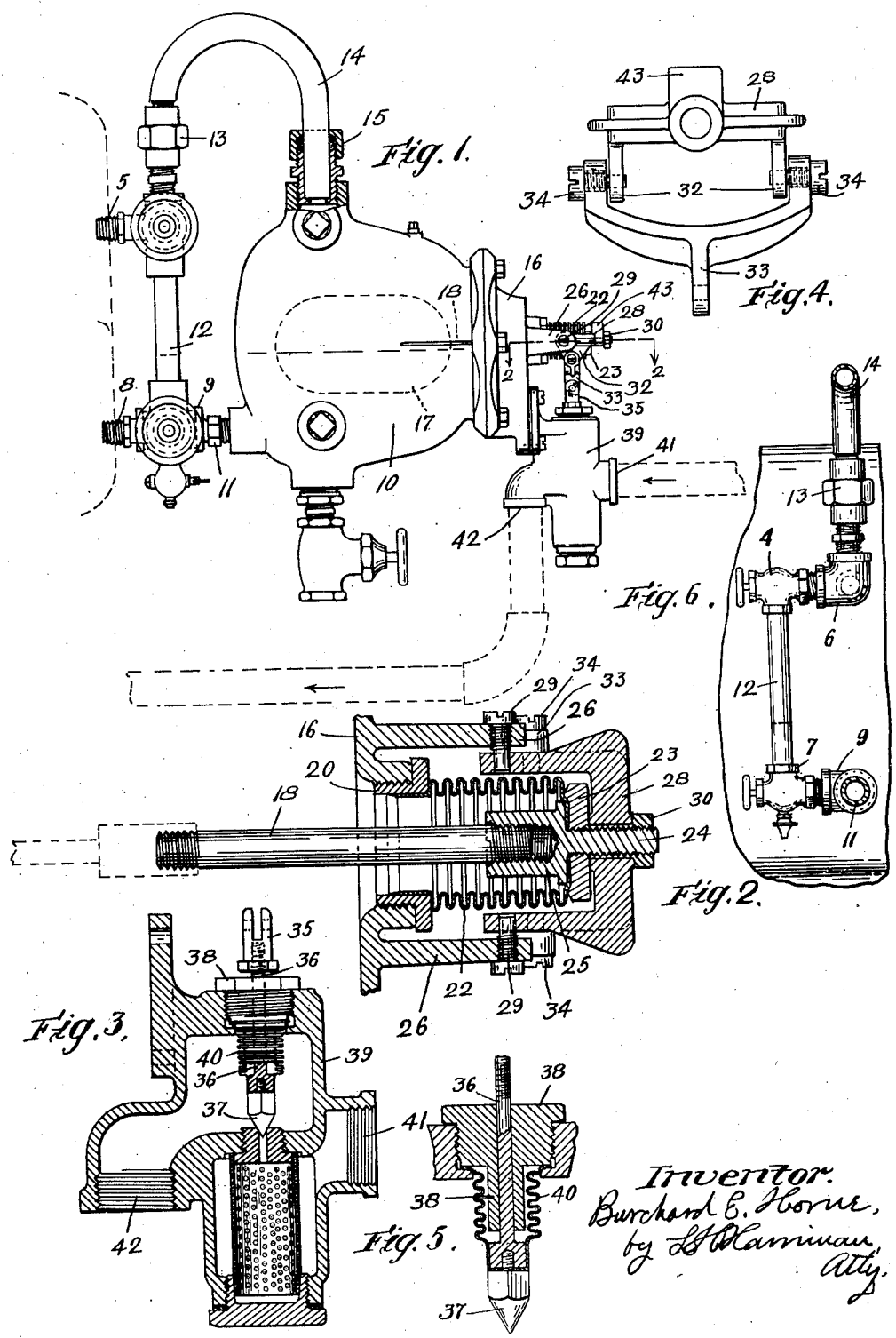
Inventor.
Burchard E. Horne,
by L. S. Hanninau
Atty.

Patented Feb. 26, 1935

1,992,212

UNITED STATES PATENT OFFICE 1,992,212

STEAM BOILER REGULATOR

Burchard E. Horne, Andover, Mass.

Application February 27, 1933, Serial No. 658,732

2 Claims. (Cl. 137—68)

This invention relates to regulators which are employed in connection with steam boilers for the purpose of maintaining the water in the boiler at a predetermined level, and which frequently employ in connection therewith devices for controlling the fuel supply, in case the water supply fails, or the pressure is raised to an excessive point.

Devices of this character usually employ a float chamber which is in open communication with the boiler and is located at the level of the gage glass in open communication with the upper and lower ends thereof, and the present invention more specifically relates to devices of this character in which a flexible diaphragm, or tube, is provided between the float and the water supply valve, through which the connections between the float and the valve extend, so that the float chamber is effectively sealed at this point.

A type of flexible sealing means, which has generally been found effective for this purpose, is of the so-called "bellows" type, which consists of a tube of flexible sheet metal bent to form a series of annular corrugations, so that it may be readily flexed transversely, or may be elongated or shortened longitudinally, as, for example, a bellows of the "sylphon" type.

As previously employed in this connection, flexible tubes of this character have been subjected to distortions which tend ultimately to cause rupture, and a primary object of my invention is to provide an improved form of connection between the float lever and the valve which it controls which will employ a sealing means of the bellows type above referred to, and with which the extent of the distortion of the bellows, when the float rises and falls, will be so slight as to be practically negligible, so that the bellows will not be subjected to any strain or distortion which will tend to shorten its period of usefulness.

Further objects are to provide an improved form of valve to be employed in connection therewith and to provide an improved means for connecting the float chamber to the boiler, whereby the threaded openings for the gauge glass connections may be employed for connecting the float chamber thereto and the gauge glass may be interposed between the boiler and the float chamber, so that the gauge glass will always correctly indicate the water level in the boiler and its action will be unaffected by the presence of the float chamber.

I accomplish these objects by means of the construction hereinafter described and as illustrated in the accompanying drawing in which:

Fig. 1 is a side elevation of a water regulator provided with an embodiment of my invention.

Fig. 2 is a sectional view on a larger scale, at line 2—2 of Fig. 1.

Fig. 3 is a sectional view of the water supply valve.

Fig. 4 is a detail view of the connecting means between the float lever and the valve stem.

Fig. 5 is a detail sectional view of the water supply valve, and

Fig. 6 is a detail view of the connection between the boiler and the float chamber.

As shown in the drawing, the float chamber 10 is directly connected at its bottom by a nipple 11 to a three-way fitting 9, one threaded port of which is directly connected to the boiler by a nipple 8 and the other threaded port of which is adapted to receive the gage glass fitting 7, which may have previously been directly connected to the boiler. A three-way fitting 6 is connected to the boiler by a nipple 5 and one port of the fitting 6 receives the top gage glass fitting 4 which is so arranged that the gage glass 12 may be placed therein. One end of a goose neck pipe 14 is connected by a union coupling 13 to the other port of the fitting 6, said pipe 14 being extended upwardly therefrom and then being curved semicircularly and extended vertically downward, the straight portion thus provided being connected to the top of the float chamber by a slipjoint connection 15. Other openings, having screw plug closures, are provided in the side walls of the float chamber adjacent its bottom to permit connection to be made with the float chamber at these points, as conditions may require.

The opposite end of the float chamber, from that to which the connections to the boiler are made, is provided with an opening having a centrally apertured cap 16, which is bolted thereto, said cap, when removed, permitting the insertion of the float 17, which is mounted on a rod 18. A sleeve 20 is telescoped with one end portion of a tubular bellows 22 of flexibly corrugated metal and is soldered thereto, making a tight connection therewith, and said sleeve is threaded externally and is screwed into the aperture of the cap 16, so that a tight connection between the bellows and the float chamber is provided. The opposite end of the bellows 22 has an inturned flange, which is clamped between a nut 23 and a shoulder formed on a bolt 24, the engaging side of said nut being dished to provide a tight connection therebetween. The head 25 of the bolt 24 is bored and threaded to receive the threaded end of the float rod 18, which is placed in position after the bolt has been clamped to the bellows.

A pair of lugs 26 are formed integrally with the cap 16 and project horizontally therefrom at each side of the cap aperture, and a rigid yoke 28 is mounted on aligned pivots 29 in the ends of said lugs, so that the yoke will swing about a horizontal axis which intersects the longitudinal central line of the bellows 22 approximately at the middle thereof. An aperture is formed in the middle of the yoke, through which the bolt 24 is passed and the yoke is clamped against the nut 23 by a nut 30, so that all of said parts are rigidly secured together.

As thus arranged a watertight connection is provided between the cap 16 and the yoke 28 which permits the necessary vertical swinging movement of the float rod.

The yoke 28 is provided with integral arms 32 which depend at each side thereof, and the arms of a Y-shaped link 33 are connected to the arms 32 by aligned pivot screws 34. The lower end of said link 33 is pivotally connected to a clevis 35, which is threaded on the upper end of a valve stem 36, and a conical valve 37 is threaded on to the lower end of said stem. The stem 36 is reciprocally mounted in a bonnet 38, which is threaded into the top of the valve casing 39; said bonnet having an elongated guiding portion 38′ for the stem 36, and being arranged to clamp an outturned flange on the top end of a flexible bellows tube 40 against a shoulder in the casing 39. The tube 40 also has an inturned flange at its lower end which is clamped between shoulders on the stem 36 and valve 37, and as said tube may be elongated or contracted in length, reciprocal movement of stem 36 is permitted.

As thus arranged leakage past the valve stem, and also access of water to the valve stem guiding means is prevented. The casing 39 has an inlet 41 connected to the water supply and an outlet 42 which is connected to the boiler.

With the above described construction it will be apparent that the float lever 18, as it rises and falls, will swing about the pivots 29 as a center, causing the yoke 28 to swing correspondingly and its arms 32 to swing laterally, so as to permit the valve 37 to be lifted from its seat, when the float is lowered, and to force it to its seat when the float is raised.

As the yoke 28 extends across the outer end of the bellows, it securely holds the same against longitudinal extension by the pressure within the float chamber, and as the yoke swings about an axis which intersects the bellows at its middle portion, and, as the bellows is connected to the yoke at its outer end, and is rigidly connected to the casing at its inner end, when the float rises and falls and swings about the axis of the pivots 29, the bellows 22 will be slightly flexed at its middle portion, so that it will be slightly curved at this point, the flexing action being thereby distributed among the corrugations adjacent its middle portion, so that the flexing strain, at the points where it occurs is very slight, and is of a substantially less destructive nature than it would be if the pivotal point was beyond the outer end of the bellows 22, in which case the distortion would be localized at and adjacent this end and would tend to bend the bellows in a reversely curved formation, which is believed to be more likely to be detrimental to the bellows than the slight flexing of the middle portion caused by the construction herein described.

A projection 43 on the middle of the yoke 28 may be conveniently employed to operate an electrical connection, to control the fuel supply, in case the water supply should fail.

The leverage action secured by the float lever on the valve by the above described arrangement is very powerful, so that the valve will be pressed against its seat with considerable force and will prevent leakage past the valve when in its closed position.

I claim:

1. A water regulator comprising a closed float chamber, a flexible tube connected at one end to said chamber through an opening in the wall thereof and having an inturned flange at its opposite end, a bolt having its head engaged with the inner side of said flange, and a nut threaded on said bolt and engaged with said flange, to clamp the same against said head, means for connecting a float in said chamber to said bolt, a yoke having its arms pivotally mounted at opposite sides of said tube and having its intermediate portion rigidly connected to said bolt, and operating means engaged with said yoke.

2. A water regulator comprising a closed float chamber, a flexible tube connected at one end to said chamber through an opening in the wall thereof and extending outwardly therefrom, a closure connected to the outer end of said tube, a float rod extending into said tube from said chamber and having a rigid connection with said closure, a yoke having the arms thereof pivotally mounted at diametrically opposite sides of said tube, to swing about an axis between the ends of said tube, the intermediate portion of said yoke being extended about the outer end of said tube and rigidly connected to said closure, a link connected at one end to the arms of said yoke excentric of the pivots thereof, and a valve stem pivotally connected to the opposite end of said link, whereby, as the yoke is swung on its pivots by the float, said stem may be moved longitudinally.

BURCHARD E. HORNE.